July 24, 1962 P. E. OSBORN 3,046,348

MEMORY FOR USE IN ELECTRONIC TELEPHONE SYSTEM

Filed Oct. 12, 1959 8 Sheets-Sheet 1

INVENTOR
Peter E. Osborn
BY C. A. Gulbrandsen
Atty.

July 24, 1962 P. E. OSBORN 3,046,348

MEMORY FOR USE IN ELECTRONIC TELEPHONE SYSTEM

Filed Oct. 12, 1959 8 Sheets-Sheet 2

MEMORY FOR USE IN ELECTRONIC TELEPHONE SYSTEM

Filed Oct. 12, 1959 8 Sheets-Sheet 6

MEMORY FOR USE IN ELECTRONIC TELEPHONE SYSTEM

Filed Oct. 12, 1959 8 Sheets-Sheet 8

HIGH SPEED CLOCK
700

LOW SPEED CLOCK
200

SYSTEM PHASER 900

United States Patent Office 3,046,348

Patented July 24, 1962

3,046,348
MEMORY FOR USE IN ELECTRONIC TELEPHONE SYSTEM

Peter E. Osborn, Addison, Ill., assignor to Automatic Electric Laboratories, Inc., a corporation of Delaware Filed Oct. 12, 1959, Ser. No. 845,736
15 Claims. (Cl. 179—15)

This invention relates in general to a communication system and more particularly to a ferrite core distributor and memory system for a small electronic telephone switching system. More particularly, this invention covers a memory for a telephone system employing a time division multiplex technique for intra-office transmission similar to that disclosed in copending U.S. application of A. H. Faulkner and D. K. Melvin, Serial No. 843,380 filed on September 30, 1959. The subject matter of this invention therefore relates to the particular circuitry and techniques employed in the memory and associated circuitry of such a telephone system.

An object of this invention shall be to provide a high-speed ferrite core memory with associated circuitry, for use in a small electronic telephone time-division multiplex switching system. One feature of this invention is a memory facility for the storage of information regarding a telephone call between appearances in a time interval associated with the call. A second feature shall be the providing of this information upon demand of logic circuitry to initiate commands to line circuitry in a transmission network. Another feature of this invention is the application of a current steering principle to the pulse distributors that are associated with the memory. A still further object of this invention shall be to provide a memory system for the control of transmission between calling and called parties, and also the control of necessary switching functions associated with the establishment and ultimate disconnection of a call.

In the control of a telephone switching system like that disclosed in the aforementioned copending application difficult problems arise such as the proper sampling of the audio signal in the transmission network, the proper use of logic circuitry and the storage and use of information required to affect and maintain the interconnect of the two telephone subscribers. This invention proposes a high-speed ferrite core memory and associated circuitry for use in such small electronic telephone switching systems. The memory itself is an application of the high-speed ferrite core memory and the pulse distributors include application of the current steering principle.

A primary function of the memory is to store information regarding a call between appearances of the time slot associated with the call, and to provide this information upon demand of logic circuitry to initiate commands to the proper line gates in a transmission network. The information stored will be the telephone numbers associated with the calls and the supervisory information, such as the sending of ringing tone, busy tones, dial tone, ring back tone, and switching the call through.

The specific requirement of the system is to provide forty time slots of two microseconds' duration; this time slot is divided into two parts, the first ½ microsecond used to read out the memory and to clamp the common highway ground and the last 1½ microseconds to provide write-in time for the memory and to provide the transmission time for the time slot. The pulse that occurs in the first ½ microsecond is referred to as a "read" pulse, the pulse occurring for 1½ microseconds will be referred to as a "write" or "half-write" pulse.

Figure 1:
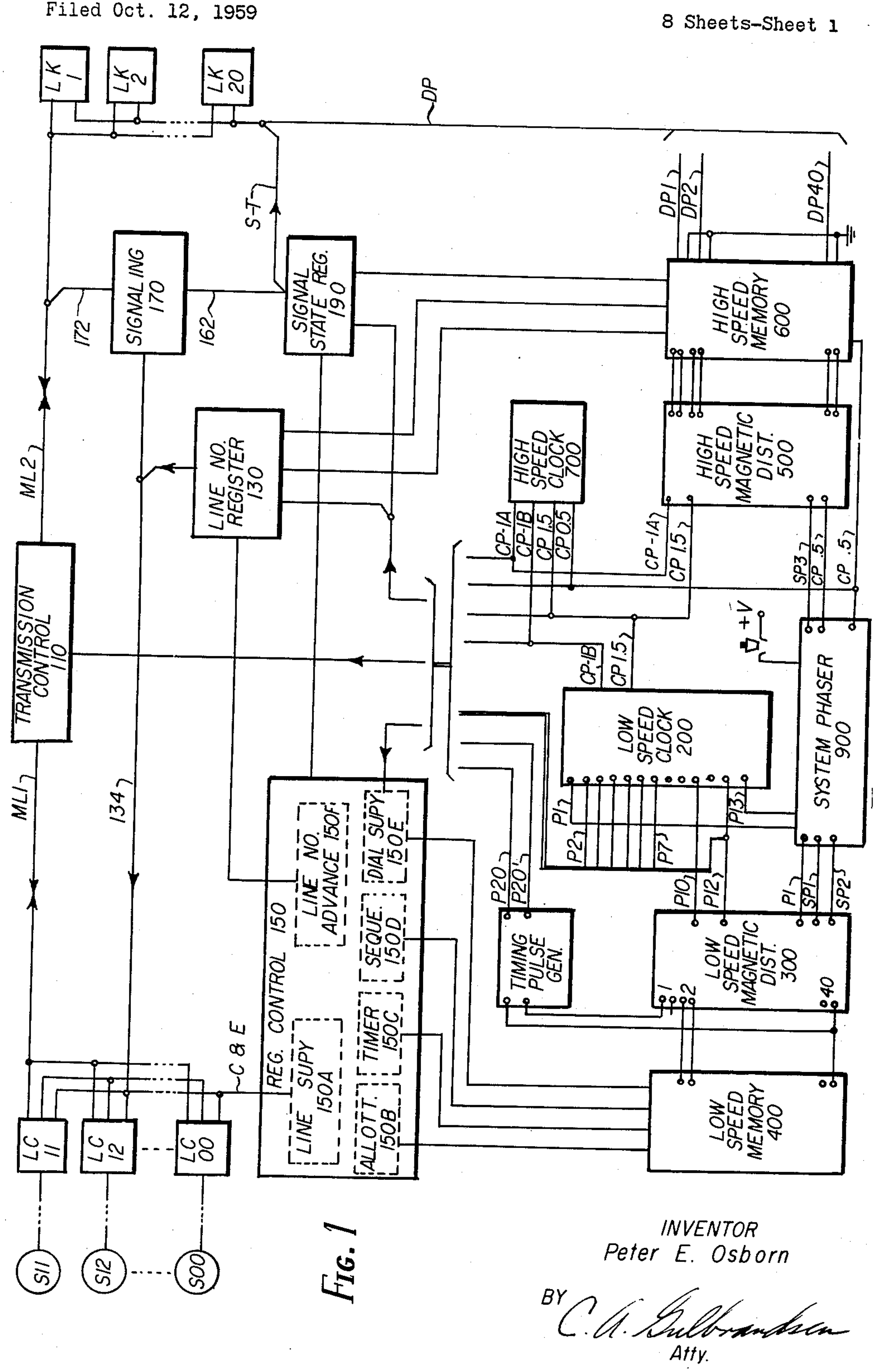
FIG. 1 is a system block diagram.

Referring to FIG. 1, the exchange which is similar to that disclosed in the copending application of A. H. Faulkner and D. K. Melvin, Serial No. 843,380, filed September 30, 1959, includes 100 line circuits LC11 to LC00 associated with stations S11 to S00, and a plurality of link circuits LK1 to LK20 interconnected by a time division multiplex transmission highway ML1—ML2 having a transmission control unit 110 interposed therein. Any two line circuits may be effectively connected through any link circuit by selectively supplying control pulses to them.

The signaling circuits 170 supply supervisory tones which are transmitted by time division multiplex over line 172 and the highway ML1—ML2 to the line circuits of calling lines. The signaling circuits 170 also supply ringing control signals over conductors in the control line 134 to the line circuits of called lines.

The function of remembering which circuits are interconnected on a time division multiplex basis over highway ML1—ML2 and of supplying control pulses to the selected transmission gates in the appropriate time slots is performed by a high-speed memory 600 in conjunction with a line number register 130 and a signal state register 190. The control pulses are supplied to the line circuits over line 134, to the link circuits over lines DP and S-T, and to the signaling circuits over line 162.

The selective registration in the high-speed memory through the line number register 130 and the signal state register 190 is controlled by the register control circuits 150. These circuits control the line finding function of scanning to find a line which has initiated a call and causing a connection to be established to the calling line; and the connector function of detecting dial pulses from the calling line and causing a connection to be established to the called line. These control circuits 150 are shared by all of the links on a time division basis, using a low-speed memory 400 for storage.

High-speed clock 700, low-speed clock 200 and timing pulse generator 800 supply all of the pulses required by the exchange.

Figure 4:
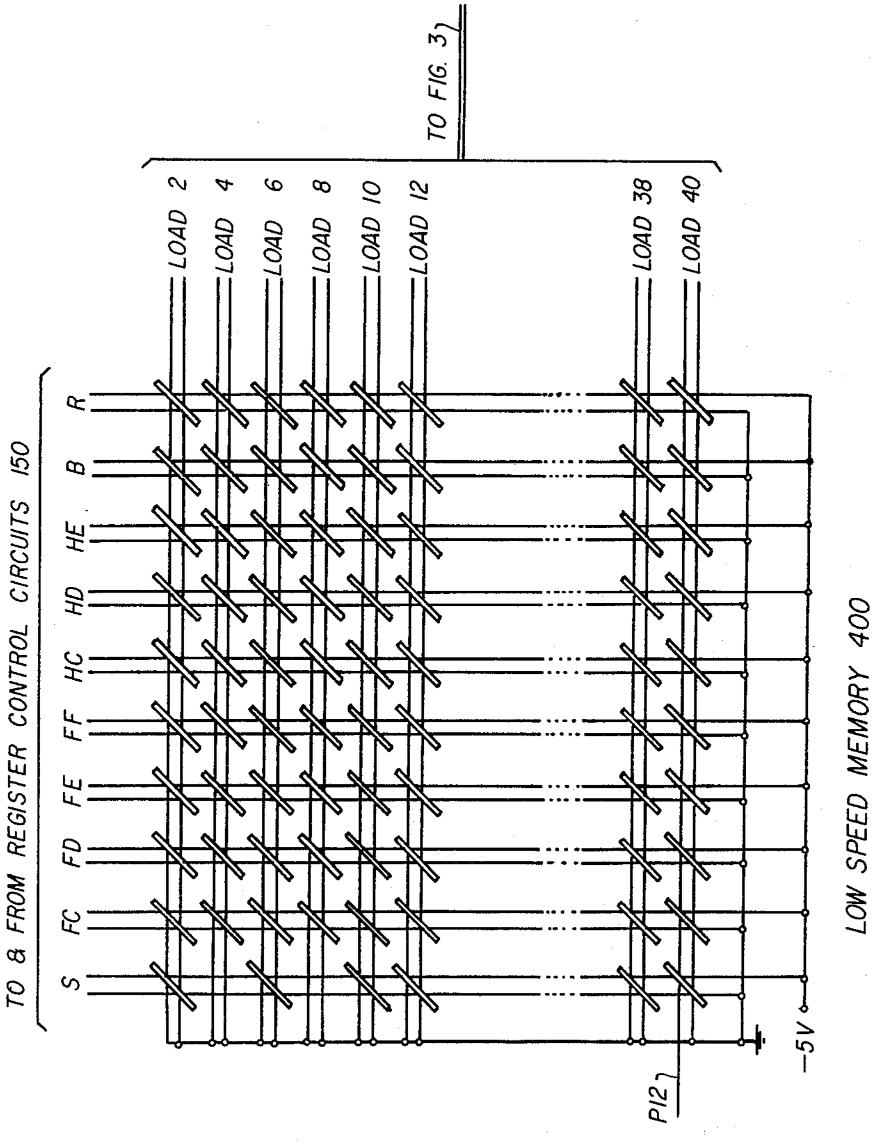
FIG. 4 is a functional diagram of the low-speed memory.
Figure 6:
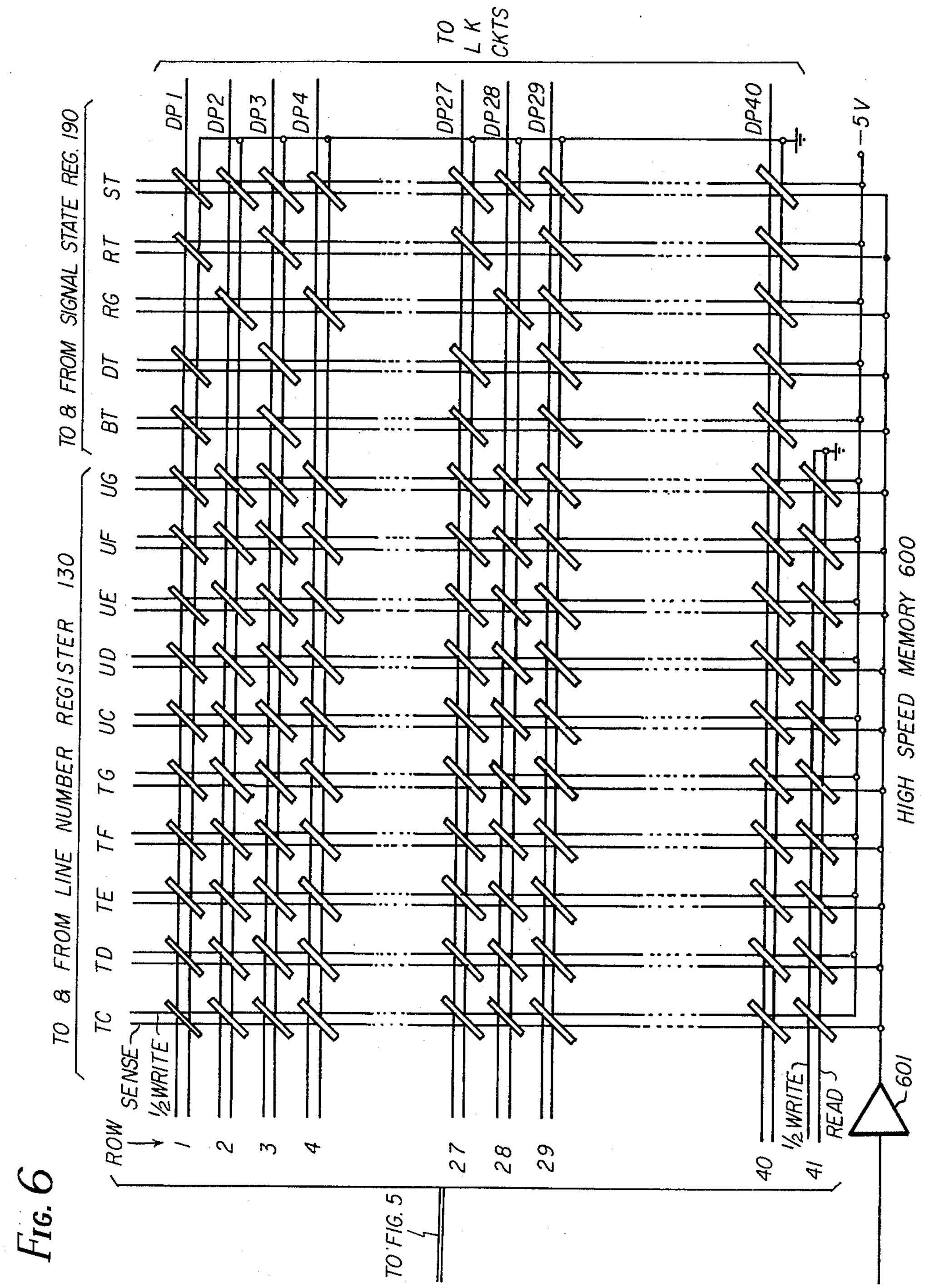
FIG. 6 is a functional diagram of the high-speed memory.

Each of the memories 400 and 600 as shown in FIGS. 4 and 6, comprises a coordinate array of ferrite cores. In each, the horizontal rows are associated with the links, and the vertical columns are associated with flip-flop type storage devices in the associated units 150, 130, and 190. Each memory is associated with a separate pulse distributor 300 and 500 to supply pulses to its horizontal conductors in turn. Each horizontal row has a read winding and a half-write winding threaded through all of the cores of the row, and each vertical column has a sense winding and a half-write winding. For each of the memories, during each stage of its distributor, a read pulse is supplied through the read winding of the row, causing the state of each core of the row to be transferred by means of the sense windings to the flip-flops in the various registers. The information in the flip-flops is then utilized and possibly altered by the associated circuitry. A half-write pulse is applied to the horizontal winding, and coincidently to selected ones of the vertical windings to return the information from the flip-flops to the cores. This is repeated, in turn, for each horizontal row during successive stages of the distributor. The high-speed memory comprises cores in five columns TC to TG for registering the tens digit, five columns UC to UG for registering the units digit, and five columns BT, DT, RG, RT, and ST for registering the signal states. Each horizontal row is associated with one time slot of the multiplex transmission. Each stage of the distributor comprises a 0.5 microsecond read pulse followed by a 1.5 microsecond half-write pulse in a two microsecond time slot. The horizontal half-write windings are connected at one end to the distributor and at the other end over line DP to the link circuits for transmission control. The half-write windings of the first two rows are connected over leads DP1 and DP2 to link 1 to control the calling party and called party transmission respectively. Successive pairs of horizontal rows are in like manner coupled to successive links, so that each link is permanently associated with two high-speed memory rows corresponding to two transmission time slots, one for the calling party and the other for the called party. Also, during each of the 1.5 microsecond pulse intervals, the line number register 130 translates the two-out-of-five code registration of the tens digit to a one-out-of-ten code signal supplied to a conductor in line 134, and the two-out-of-five code of the units digit is translated to a one-out-of-ten code signal supplied to another conductor of line 134, to control the transmission in the line circuit corresponding to this number. At the same time, the signal state register 190 controls the transmission of supervisory tones to the calling line, ringing to the called line, and switch-through of the link transmission gates, as required.

In the register control circuits 150, the line supervisory circuit 150F receives hookswitch and line-busy information from the line circuits and registers this information in flip-flops for use by the other circuits. The allotter circuit 150B assigns a scanning link to a line which initiates a call. The allotter is associated with the cores in column S of the low-speed memory 400 to register whether or not a link is scanning. The timer circuit 150C times the dialing and other hookswitch signals to determine when the sequence state should be changed. The timer uses the cores in columns FC, FD, FE, and FF to register the time interval on a binary basis, separately for each link. The sequence circuit 150D registers the sequence states of the links, which are: normal, tens dialing, units dialing, busy test, ringing, and conversation. The sequence circuit uses the cores in columns HC, HD, and HE to register these states on a binary basis for each link. The dialing supervisory circuit 150E is provided to insure that the control circuits do not respond more than once to each dial pulse. This circuit uses the cores in columns B and R, column B being set for the duration of a digit, and R being set only for the duration of a dial pulse. The line-number-advance circuit 150F supplies advance or rewrite signals to the line number register 130 to control the number registration in the high-speed memory 600. The output pulses from high-speed clock 700 drive distributor 500 for driving the high-speed memory 600 and supplies pulses for the transmission circuit. The output of the high-speed clock 700 also drives a low-speed clock 200 which includes a seventeen stage distributor primarily for controlling logic circuits in the register control circuit 150. Pulses from the low-speed clock 200 also drive a distributor 300 which drives the low-speed memory 400. A timing pulse generator 800 is driven by pulses from distributor 300 to control the timer circuit 150C.

In reference to the pulses, the following definitions relate to the terms used in this application:

Time slot—a two microsecond interval, being one complete cycle of the high-speed clock 610. Each time slot comprises a 0.5 microsecond guard interval followed by a 1.5 microsecond interval during which transmission and various control operations take place.

Transmission cycle—a time interval comprising 40 time slots or 80 microseconds, being one cycle of the distributor 500.

Logic cycle—a time interval comprising 17 time slots or 34 microseconds, being one cycle of the low-speed clock 200.

Frame—a time interval comprising 40 logic cycles totaling 680 time slots or 1360 microseconds, being one cycle of the distributor 300.

Timer step—an interval of 20.4 milliseconds, being one cycle of the timing pulse generator 800.

Coincident—used with reference to two or more signals which overlap in time, usually at the input of a gate.

Simultaneous—used with reference to signals or events occurring during the same time cycle, such as a transmission cycle or a frame, although possibly in different time divisions of the cycle.

Figure 7:
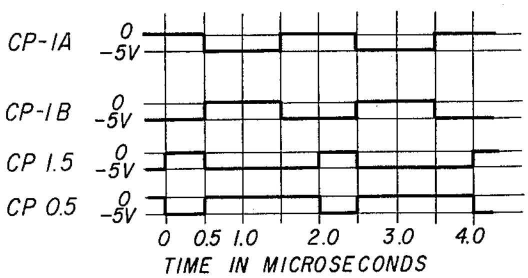
FIG. 7 is a graph of the high-speed clock pulses.

FIG. 7 is a graph of the pulses produced during each time slot by the high-speed clock 700. The pulses on lead CP0.5 occur during the guard interval and have a duration of 0.5 microsecond. The pulses on lead CP1.5 occur during the remainder of the time slot and have a duration of 1.5 microseconds. The pulses on lead CP1A and CP1B each have a duration of one microsecond and occur during each time slot as shown.

The distributor 500 has forty stages and is driven one stage per time slot. The input is supplied by the pulses on leads CP0.5 and CP1.5 from the high-speed clock 700. Each stage drives a row of the high-speed memory 600, and has two output leads threaded through the cores of the corresponding row. One of the outputs of each stage is a 0.5 microsecond pulse for applying a read-out potential to the cores. The other output from each stage is a 1.5 microsecond signal for supplying a half-write potential to the cores. The leads from these outputs extend through the memory 600 to the distributor pulse leads DP1 to DP40, which are connected individually to transmission gates of the links. Lead DP1 is connected to the calling side transmission gate, and lead DP2 is connected to the called side transmission gate of link 1. The succeeding pairs of the leads DP are connected to succeeding links, each odd-numbered distributor pulse being supplied to a calling side gate, and each even-numbered distributor pulse being supplied to a called side gate of a link. Thus each of the forty distributor pulses corresponds to one time channel of the multiplex transmission, and is permanently associated with a link transmission gate.

Figure 8:
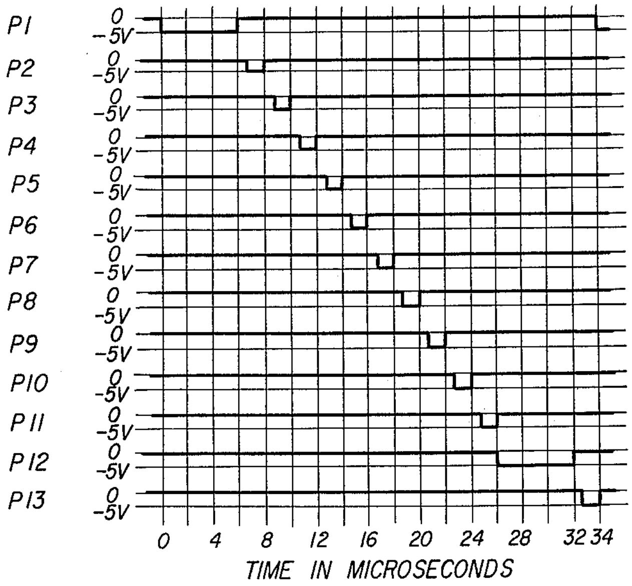
FIG. 8 is a graph of the low-speed clock pulses.

FIG. 8 is a graph of the pulses produced by the low-speed clock 200. This clock is driven by pulses on lead CP1B and CP1.5 from the high-speed clock 700, and is driven one stage per time slot. There are seventeen stages in its cycle for a total of 34 microseconds. The output of the first three stages are combined to produce a continuous six microsecond pulse on lead P1. During each of the stages 4 to 13 output pulses are produced on leads P2 to P11 respectively each having a duration of 1.5 microseconds coinciding with the pulse on lead CP1.5. The output of the stages 14 to 16 are combined to produce a continuous six microsecond pulse on lead P12. During stage 17 a 1.5 microsecond pulse is produced on lead P13. The pulses P1 to P13 comprise one logic cycle.

The distributor 300 has forty stages, and is driven one stage per logic cycle by input pulses on leads P1 and lead P12 from the low-speed clock 200. The output from the even-numbered stages are used to drive the horizontal rows of the low-speed memory 400. There are two leads for each row. On one of the leads a read-out potential is applied during the interval coinciding with the pulse on lead P1, and on the other a half-write potential is supplied during the interval coinciding with the pulse P12. Each of the horizontal rows of the memory 400 is associated with one of the twenty links. Thus during each logic cycle a read-out pulse is supplied to one of the rows during the pulse interval P1, transferring the information in this row into the circuits of the register control circuit 150. During the pulse intervals P2 to P11 various logical operations occur in the circuits 150A to 150F, which may alter some of this information. During the pulse interval P12 a half-write potential is applied to this horizontal row and to the selected ones of the vertical columns to write the information back into the cores. During the pulse interval P13 the flip-flops in the register control circuits are cleared in preparation for the next logic cycle, which corresponds to another link.

In this system there are two groups of time division multiplex circuits having different distribution cycles, one of the groups being associated with the high-speed memory 600, and the other group being associated with the low-speed memory 400.

The high-speed circuits control the time division transmission of voice and tone signals over the multiplex line ML1—ML2. Referring to FIG. 1, and also to FIGS. 5 and 6, the high-speed circuits include the high-speed clock 700, the high-speed magnetic distributor 500, the high-speed memory 600, as well as the line number register 130, the signal state register 190, all of the line circuits LC11 to LC00, all of the link circuits LK1 to LK20, the signaling circuits 170, and the transmission control unit 110. The high-speed clock 700 has a cycle of two micro-seconds which is referred to as a time slot. As shown in FIG. 7, the time slot is divided into 0.5 microsecond intervals, corresponding to the respective outputs CP0.5 and CP1.5 from the clock. The output pulses from the clock 700 drive the high-speed magnetic distributor 500. This distributor has forty stages of two microseconds each, making a total cycle of eighty microseconds. Each cycle of this distributor is one transmission cycle on the multiplex line ML1—ML2, and each stage occurring in successive cycles comprises one transmission channel. In each channel transmission occurs during the 1.5 microsecond interval, and the 0.5 microsecond interval is used as a guard interval between channels. The distributor 500 has two output leads for each stage, and for each stage the pair of output leads are threaded through one horizontal row of the high-speed memory 600. On one of the leads a read pulse is delivered during the 0.5 microsecond interval, and on the other a half-write pulse is delivered during the 1.5 microsecond interval. The writing leads extend through the memory and thence to the links to form the principal distributor pulse output leads. These forty DP leads are grouped in successive pairs extending to the twenty links. For each link the odd-numbered DP pulse is used for controlling the calling line gate, and the even-numbered pulse is used for controlling the called line gate. Thus, each link uses two adjacent channels in the transmission cycle for a connection between two lines.

The line number register 130 in conjunction with the associated cores in the high-speed memory 600 delivers pulses to the line circuits in coincidence with the pulses delivered to the link transmission gates with which they have been selectively connected.

In accordance with stored information in the high-speed memory 600, the line number register 130 delivers pulses to the line circuits, and the signal state register delivers pulses to the signaling circuit 170 and to the link circuits LK1 to LK20, so that for each channel for which a connection has been established, two transmission gates connected to the multiplex line, one at the end ML1 and the other at the end ML2, are pulsed in coincidence.

The low-speed circuits provide for time division sharing of the circuits used in performing most of the logical operations required by the links to set up connections between lines. Referring to FIGS. 1, 2A, 2B, 3, and 4, these circuits comprise the low-speed clock 200, the low-speed magnetic distributor 300, the low-speed memory 400, the register control circuits 150, and a timing pulse generator 800.

The low-speed clock 200 is a distributor which produces thirteen output pulses requiring a total of seventeen time slots or 34 microseconds, as shown in FIG. 8. This clock cycle is referred to as a logic cycle and is one time division of the total low-speed cycle. The low-speed magnetic distributor 300, driven by the pulses P1 and P12 from the output of the low-speed clock, has forty stages. Each cycle of this distributor is one complete low-speed cycle, and is referred to as a frame. Thus, such frame comprises forty logic cycles or a total of 1360 microseconds. The even-numbered stages of the distributor 300 are used to drive the twenty rows of the low-speed memory 400, each delivering a read pulse during the pulse interval P1 and a half-write pulse during the pulse interval P12. Each of these memory rows, driven by an even-numbered stage of the distributor 300, corresponds to one of the links. During each such logic cycle which corresponds to a link, in the pulse interval P1 information is transferred from the low-speed memory 400 to the register control circuit 150; during the pulse intervals P2 to P11 the line supervision leads C and E are analyzed, the information obtained from the line circuits and memory is used to perform logical operations and to deliver appropriate output signals to the line number register 130 as well as to the signal state register 190; during P12 the information, which may or may not have been altered, is transferred back into the same row of the memory 400; and during the pulse interval P13, the register control circuits 150 are cleared in preparation for the logic cycle of the next link. Thus, during each frame, each link shares the register control circuits 150 for one logic cycle, with alternate logic cycles being unused.

Thus, the logic circuits are time shared at a low repetition rate to permit time to perform the various logical operations, while the transmission circuits are time shared at the high repetition rate required for the faithful reproduction of voice signals.

The pulse repetition rates of the different distributors are so arranged that the logic state of each link is analyzed and acted on once and only once per frame. The identity of which link is associated with a logic cycle is established by coincidence of a given logic pulse with a pulse of the high-speed circuits. To accomplish this the period of a logic cycle has been chosen to be seventeen time slots, and of a transmission cycle, forty time slots; since these numbers have no common divisor, that is, seventeen is not a prime factor of forty. Thus each frame comprises seventeen transmission cycles and forty logic cycles, and the relation of coincidence between logic cycles and transmission cycles will repeat only once per frame.

The arrangement with a high-speed and a low-speed memory could also be used with a PABX having trunk circuits to the main exchange. These trunk circuits would require only one time position of the transmission cycle. The trunk circuit could then be identified in the low-speed circuit by the coincidence of the pulse P2 of a logic cycle with the single transmission cycle pulse.

Before examining the detailed circuitry of applicant's invention an understanding of the timing relationship between the high and low-speed memories should be undertaken.

Clock pulses CP0.5 and CP1.5 from the high-speed clock 800 are used as input pulses for the read and write pulses in the high-speed magnetic pulse distributor 500 and associated memory 600. The high-speed distributor 500 counts these pulses and distributes them in forty sequential stages to the forty vertical rows in the high-speed memory. As each row is read out the information is stored in the associated register circuits 130 and 190 where it provides the line gate pulse as operated on by the logic so that the same or different number can be written back into the memory.

The CP1.5 pulse continues through the memory where it provides a half-write and onto the link circuits where it provides the link gate pulse. Thus while the tens and units registers are writing in the memory and pulsing a line gate the DP pulse is pulsing a link gate and the line and link are connected in that time slot.

CP0.5 is also going to the low-speed clock 200 where a count of seventeen is obtained; three counts going for P1 and three counts going to P12 with the other eleven counts providing P2 to P11 and P13. The relation between the low-speed clock 200 and the high-speed distributor 500 is such that every seventeen times the high-speed distributor circulates it will re-enter the same relationship with the low-speed clock. That is to say that DP1 will coincide with P2 every seventeenth time that DP1 appears since the low-speed clock count is a prime number then in seventeen circulations the high-speed distributor P2 will have coincided with every DP pulse one time and the low-speed clock will have recycled forty times.

The P1 and P12 outputs of the low-speed clock 200 are used as the read and write pulses for low-speed distributor 300 and low-speed memory 400. The low-speed distributor has forty stages and therefore cycles one time for every forty cycles of the low-speed clock 200 or seventeen cycles of the high-speed distributor 500.

The low-speed memory is read out of during P1 into the low-speed register 150. Logic functions are performed during P2 to P11 pulses, and the memory is written back into during P12 pulse. The low-speed registers are reset during the P13 pulse.

The time slots operated on are those coincident with the P2 and P3; P2 for the calling time slot and P3 for the called. In the memory the odd-numbered rows are for the calling party time slot and the even-numbered rows for the called party time slot. There is one low-speed memory row for each link with a maximum of twenty links or twenty low-speed memory rows. Since even-numbered time slots are never calling party time slots, then the coincidence of a P2 pulse on any even-numbered time slots are never used and these rows do not appear in the low-speed memory. The low-speed distributor 300 outputs corresponding to these rows are simply grounded.

The fortieth output from the low-speed distributor 300 is used to provide the trigger pulse for the timing pulse generator 700 which is a count of fifteen thus every fifteenth time the low-speed distributor cycles a P20 pulse will be provided in the timing pulse generator.

Figure 5:
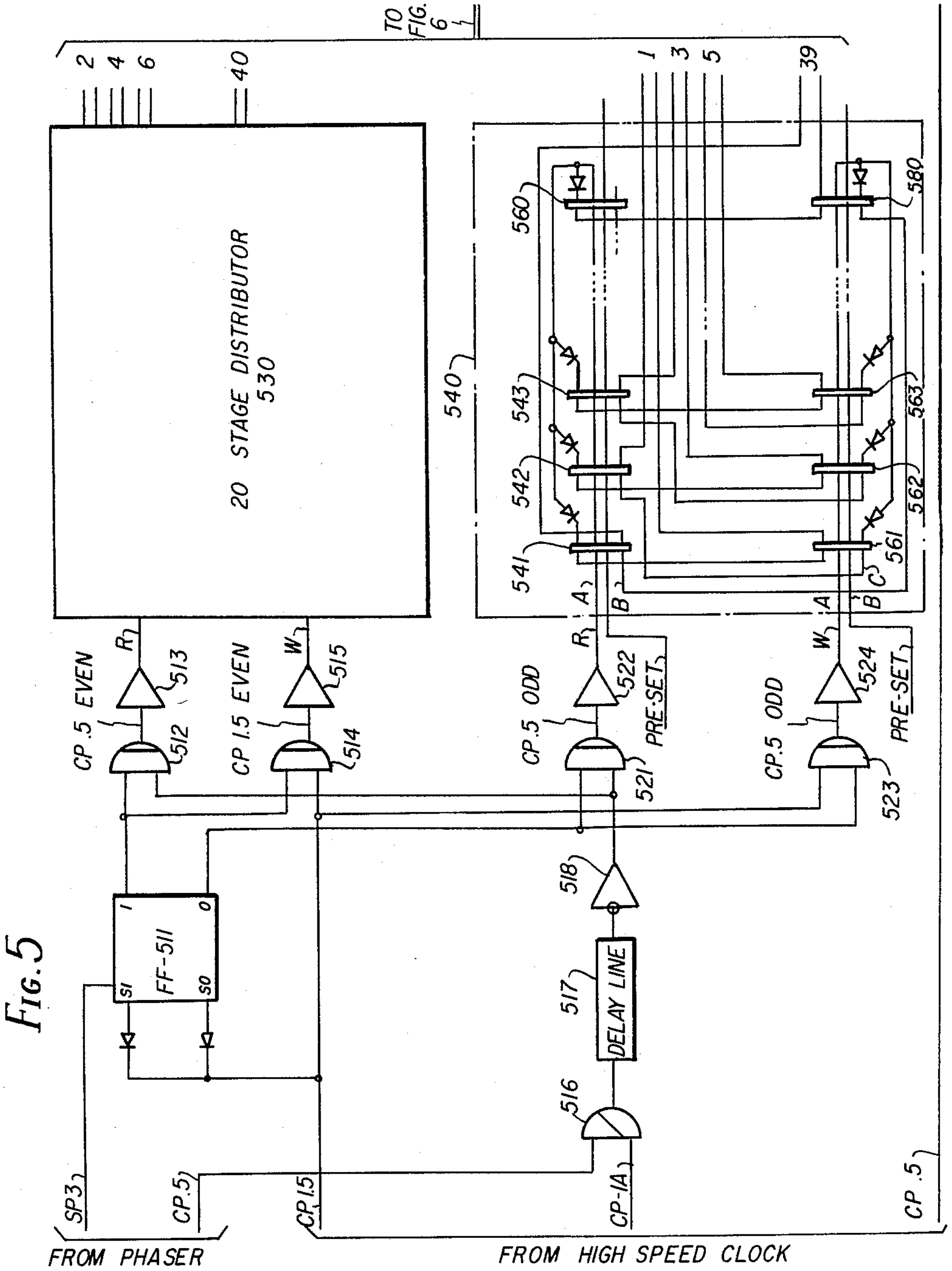
FIG. 5 is a functional diagram of the high-speed distributor.

Shown in detail in FIG. 5 is the high-speed ferrite core distributor used to supply the appropriate pulses to the high-speed memory 600. The purpose of the distributor is to receive pulses from the high-speed clock 700, change them into CP0.5 and CP1.5 pulses by suitable driver circuitry and distribute them as read and halfwrite pulses respectively to the forty rows in the memory one row at a time. In an electronic PABX telephone system such as disclosed in this application there are forty time divisions of two microseconds duration each. It is the purpose of the distributor to separate the 80 microsecond period into forty distinct time divisions. Thus it is the job of the distributor to assign a particular time slot to each of the forty rows in the memory and the distributor must be of a design so any particular row always receives the same time slot.

CP1.5 pulse from the high-speed clock is used to drive flip-flop 511 to its alternate states. The outputs of this flip-flop are combined to a series of AND gates 512, 514, 521 and 523 with the output of an amplifier 518. This amplifier in turn was driven by delay line 517 which was supplied either a CP1A or CP0.5 from the high-speed clock 700 through gate circuit 516. The outputs of the aforementioned gate circuits 512, 514, 521 and 523 are amplified by amplifiers 513, 515, 522 and 524 respectively. The first two outputs being used to drive twenty stage distributor number 530 and the second two for twenty stage distributor number 540. These pulse distributors receive the input pulses from a high-speed core driver circuitry as previously mentioned over four input leads. One pair of leads has the even-number read and write pulses and the other pair has the odd-number read and write pulses. Each pair of pulses will drive its respective twenty stage distributor circuit.

Referring now to distributor 540 on FIG. 5 and assuming an initial condition of ferrite core 541 is state 1 and all other cores in state 0, the first incoming read pulse supplied from amplifier 522 must pass through the primary winding of all cores in the read row 541, 542, 543, etc. Since core 541 is the only core in state 1 and since read pulses are positive, then core 541 will be set to state 0 and all other cores in the read row will be unaffected. By setting core 541 to 0 a voltage will be induced in a secondary in such a manner as to cause most of the input current to pass through the secondary of core 541. The current passing through the secondary is such that it tends to prevent core 541 from setting to 0; thus the difference between the current in the primary and secondary windings will be the ampere turns available to switch the core. The proper design of the primaries and secondaries of core 541 will cause core 541 to take the entire duration of the read pulse to switch. The core must switch all the way to state 0 but must not complete the switch before the read pulse ends.

Since all the other cores in the read row were already in state 0 they will be only slightly affected by the read current and only a very small amount of voltage will be induced in the secondary of these cores. It is this voltage drop on the primary that limits the number of stages in the distributor. Since each core represents a small LC circuit there is a slight time delay at each core. If the overall time delay is too great the circuit will not operate because the secondary of the one switching core will seem a very large impedance during the time delay, and no current will flow in the secondary during the delay. The ampere turns switching the core is equivalent to the primary turns minus the secondary turns. During the time current in the secondary is equal to 0 the core will be switching so fast that it is possible to switch the core to the 0 state before current in the secondary can start to flow.

Most of the input current is steered through the secondary winding of core 541 down through the tertiary winding of core 561 and through the read winding of the first row in the high-speed memory 600, setting the memory cores to state 1.

At the end of the read pulse, a write pulse from amplifier 524 enters the write row, cores 561, 562, etc. This pulse sets core 561 to state 0 and steers the current through the secondary winding C of core 561 to the tertiary winding of core 542 setting it to state 1 and through the half-write winding of memory row number 1 in memory 600.

During the next two microseconds, a read and write pulse will enter the even-number pulse distributor 530 and they in turn will be sent to memory row number 2. The next read pulse to enter register 540 will set core 542 to 0, steer the current through to tertiary winding C of core 562 and to memory row 3. The following write pulses will set core 562 to 0, steer the current to the tertiary winding of core 543 and to the half-write winding of memory row 3. This distributor will continue to send each pair of rewrite inputs to succeeding memory rows. the twentieth write pulse will switch core 580 to state 0, switch core 541 to state 1 and enter the half-write winding of memory row number 39. Thus at the end of the twentieth write pulse the distributor is back to its initial condition and the ensuing read and write pulses will start a new cycle.

The high-speed memory 600 shown in detail in FIG. 6 consists of forty-one horizontal rows and fifteen vertical columns. The first twenty-eight rows are for link circuits, with rows twenty-nine to forty being used for trunk circuits and row forty-one for the transfer circuit. The first five columns are for the registration of the tens digit, the next five columns are for the registration of the units digit and the last five columns are for the registration of supervisory circuit information viz: dial tone (DT), busy tone (BT), ring generator (RG), ring-back tone (RT) and switchthrough (ST).

Each horizontal row has two windings, a read and a half-write winding, that are fed by the pulse distributors 530 or 540. The even rows being fed from distributor 530 and the odd from distributor 540. Read out is accomplished by reading out an entire row at a time giving an advantage that the read ampere turns can be very high assuring a fast read out (2/10 of a microsecond) and preventing any chance of operating a core on a minor hysteresis loop. Since the read and write windings are separate windings, the actual current for the read and half-write windings can be the same; this provides a constant current drain on the core driver power supply as opposed to fluctuating current drain if the currents were not of equal amplitude.

Due to the previously described distributor operation each row will receive a ½ microsecond read pulse followed by 1½ microsecond half-write pulse. These pulses can not appear in any other row at this time (with the exception of row 41 which will be explored later), and will reappear in this row every 80 microseconds. The read winding is such that a read pulse will assure that all cores in a row will be set to state 0. The half-write winding will provide half the ampere turns necessary to set the core to state 1, but will not affect the state of the core by itself. The half-write winding terminates in a pulse transformer in a link or trunk circuit, the purpose of which is to provide the link or trunk gate time slot pulse.

Each column has two windings, a sense winding and a half-write winding. One end of the sense winding is connected to a voltage divider that provides a negative half volt termination, the other termination is the S1 terminal on a register flip-flop in either register 130 or 190. The negative termination prevents re-setting of the flip-flop on a noise signal. One register flip-flop is associated with each column, to set a core in any one row from 0 to 1; positive voltage will be applied to the set 1 of the associated flip-flop, setting it to state 1. These flip-flops are reset to state 0 by clock pulse CP0.5 which in turn coincides with the read pulses in the horizontal rows. This means that when a core is read out (set from state 1 to state 0) providing a voltage on set 1 a voltage also appears on set 0. The design is such that set 1 will override set 0 and the flip-flop will be set to state 1. Two microseconds later CP0.5 will again appear at the register flip-flop and reset it to state 0 unless the next row also has information in that particular column.

Each vertical half-write winding has a constant current generator associated with it. Operations of these generators are controlled by logic circuitry receiving information from register flip-flops. On the rewrite condition the same columns receive a half-write pulse; on the advance condition other columns will be written into. These generators are gated from the pulse coincidence CP1.5 and therefore, can only be turned on during the same time as the horizontal half-write pulse. Under these conditions if a row is read out all flip-flops associated in that row that were in state 1 will be set to state 1, at the end of a ½ microsecond pulse allotted to the read pulse, constant current generators will be turned on and provide a half-write pulse either in the same column as the read pulse or in different columns if an advance is called for. At the same time these generators are providing half-write in certain vertical columns, the row that was read out will be getting a half-write in the horizontal row. All cores receiving both horizontal and vertical half-write will be set 1 all other cores will be unaffected. The row then stores information as to which flip-flops are to operate in this time slot when the next horizontal read out appears 80 microseconds later. By using a two out of five code it is possible to get ten combinations out of five cores or one-hundred combinations out of ten cores.

In each link (the first twenty-eight rows) of memory 600, are two rows; the odd-number row is for registration of the calling party number and the next even-numbered row is for registration of the called party number. Each link gate is permanently connected to a DP lead to receive the half-write pulse of a row. This means that each link gate has a definite time slot associated with it. The one link gate that is pulsed by a DP is directly connected back to a link gate set by a DP. This indicates that the calling and called party time slots are always adjacent reducing the possibility of cross talk since only one side of each time slot is adjacent to an "uninterested" time slot. Although trunk circuitry is not required of the telephone system disclosed in this application conditions for trunk circuits are made in rows 29 to 40. Since each trunk circuit need register only one party number; the trunk circuit needs only one row and one time slot is therefore permanently gated from the DP minus impulse of a trunk row.

In addition to the fourteen links (28 rows) and the twelve trunks (12 rows) there is a forty-first row called the transfer row. Transferring from any given row to any other row can be accomplished by the transfer row. This may be understood by assuming that it is desired to transfer the number registered in row 1 to row 40. After row 1 has been read out of the register will place half-write pulses back to the columns that were read out of. At the same time this row 1 receives a half-write pulse a similar pulse will be sent to the transfer row and both row 1 and row 41 will write in the same relative cores. The cores in row 41 will remain in this state until the read pulse appears in row 40. At the same time that row 40 is read out of the transfer row will be read out. The information from row 41 is now in the register flip-flops to row 40 half-write pulse so the number will be now rewritten into row 40. Logic circuitry will prevent row 1 from affecting the line gates and row 40 will have control of the line gate that is now registered in both row 1 and 40. Row 1 is now marked idle and the link can be used for another call.

A variable bias is placed on the sense winding termination at the end of the vertical columns. Since it is desirable to have a −5 volt bias during the write time and a −5/10 volt bias during the read pulse. Having the bias of −5 volts during the write pulse means the half-write noise spike due to the half-write noises picked up from thirty-nine cores in the column that are not being written into must exceed five volts before it can affect the registers. This means that the high voltage spike will not cause false operation for the register flip-flops. The variable bias is provided by amplifier 601 which operates during CP0.5 clock pulses extending the necessary −5/10 volts bias to the sense winding and when the CP0.5 pulse is not present the amplier is turned off and by appropriate circuitry allows the bias voltage on the sense winding to rise to −5 volts.

Figure 2A:
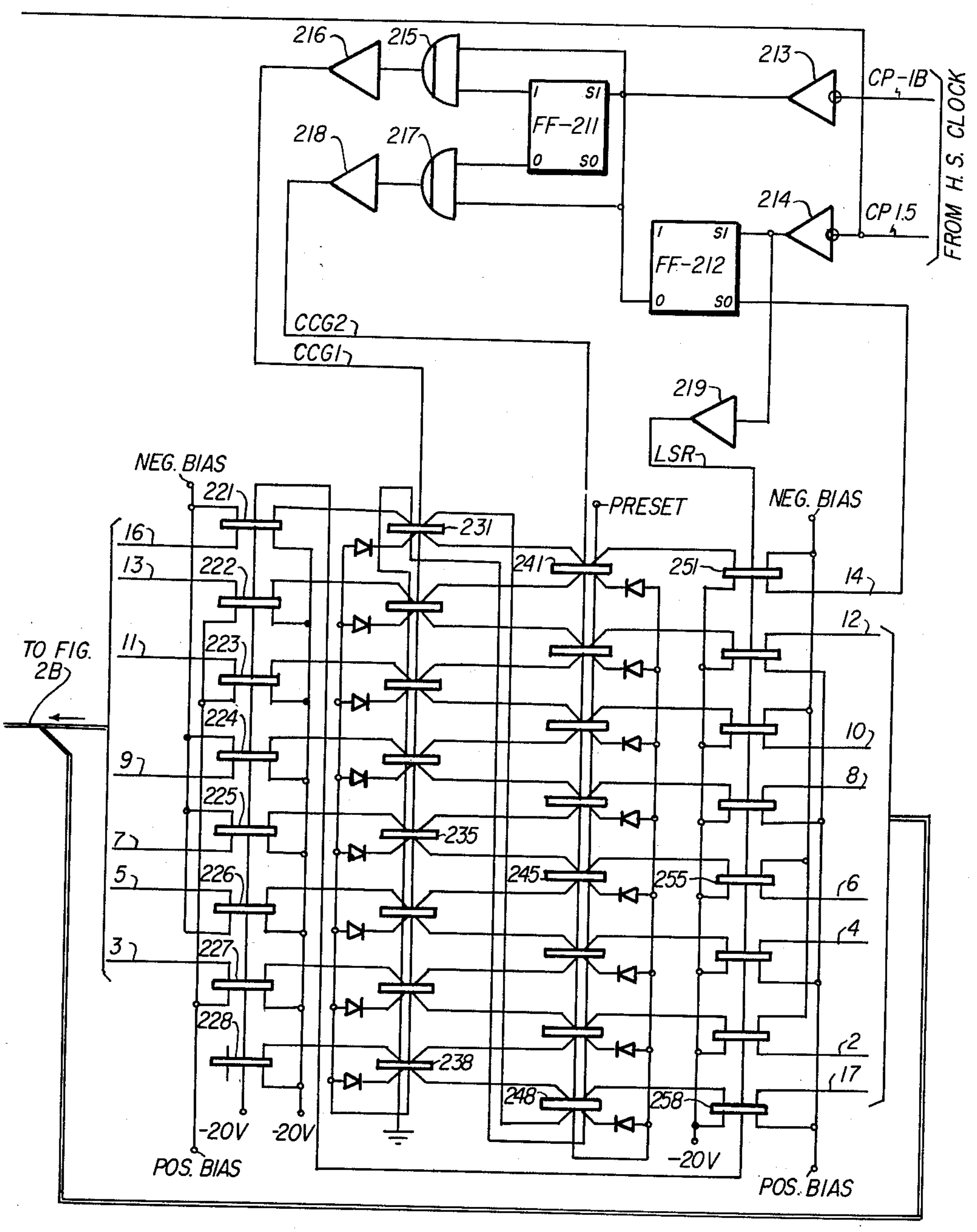
FIGS. 2A and 2B are functional diagrams of the low-speed clock.
Figure 2B:
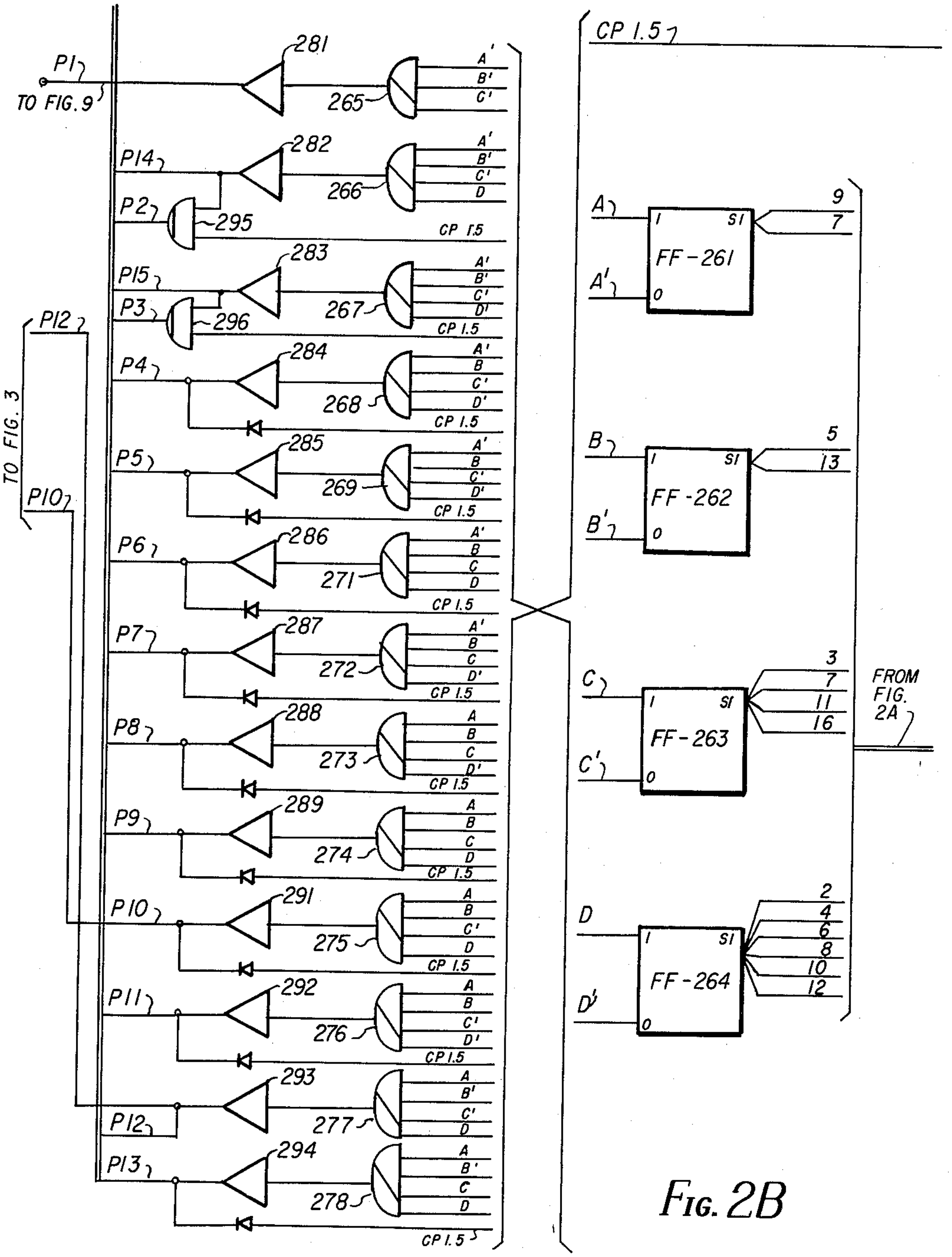

Referring now to FIGS. 2A and 2B the low-speed clock is shown in detail. The driver portion consists of a scale of two counter, 211, two write driver amplifiers 216 and 218, a read driver amplifier 219 and a flip-flop 212. Pulse CP1B originating in the high-speed clock 700 is a one microsecond pulse that starts one microsecond after CP1.5 also derived from high-speed clock. When CP1B arrives at the low-speed clock it is inverted by an inverter 213 and sent on to scale of two counter 211 from there extending to the inputs of AND gates 215 and 217, and from there to the two write driver amplifiers 216 and 218. The scale of two counter will change state with every pulse and therefore this pulse will appear alternately on the two write amplifiers.

Flip-flop 212 provides an inhibit gate to the CP1B pulse. As long as this flip-flop blocks, the counter circuit and write amplifier will operate as explained, but when the flip-flop reverses the CP1B pulses will be blocked from the counter and amplifier.

Pulse CP1.5 is fed into an inverter amplifier 214, the output being equivalent to CP0.5. This pulse then enters the set 1 of flip-flop 212. Set 0 of the same flip-flop comes from the output of the fourteenth stage of the magnetic distributor that is a portion of the low-speed clock 200. If pulses appear on the set 0 and set 1 inputs at the same time set 0 will override set 1. A pulse will then appear at set 1 every two microseconds (CP0.5), and at the end of the fourteenth output distributor a pulse will also appear on the set 0 input. Set 0 then will take over and inhibit the next CP1B pulse. Two microseconds later flip-flop will be set 1 and the inhibit will be removed from CP1B. This means it will take seventeen inputs to completely cycle the associated sixteen stage distributor. The CP0.5 pulse also goes to an emitter follower amplifier to supply the read pulse for load cores.

The magnetic distributor shown in FIG. 2A receives its input pulses from the aforementioned driver circuitry with pulses alternately appearing on leads CCG–1 and CCG–2. These pulses will be steered to one of the sixteen load cores and set the core to a 1 state. All load cores are connected in series to the read pulse which comes every two microseconds in the ½ microsecond prior to the write pulse. The outputs of the load cores designated 221 to 228, and 251 to 258 are connected to OR gate circuits and into four flip-flops shown in FIG. 2B designated 261, 262, 263 and 264. The operation of the distributor is similar to that of the high-speed distributor as previously described.

The four flip-flops 261, 262, 263 and 264 receive set pulses from the distributor, and based on their respective output conditions supply pulses to OR gate circuits 265, 269 and 271 to 278. The output at each of these gates is supplied to a pulse amplifier 281 to 289 and 291 to 294 as shown on FIG. 2B. The outputs from each of these amplifiers are gated in most instances by CP1.5 pulses from the high-speed clock. The outputs of the amplifiers are the pulses designated as P1, P2, P3, P4, P5, P6, P7, P8, P9, P10, P11, P12, P13, P14 and P15. These pulses are used as previously described throughout the entire system.

Figure 3:
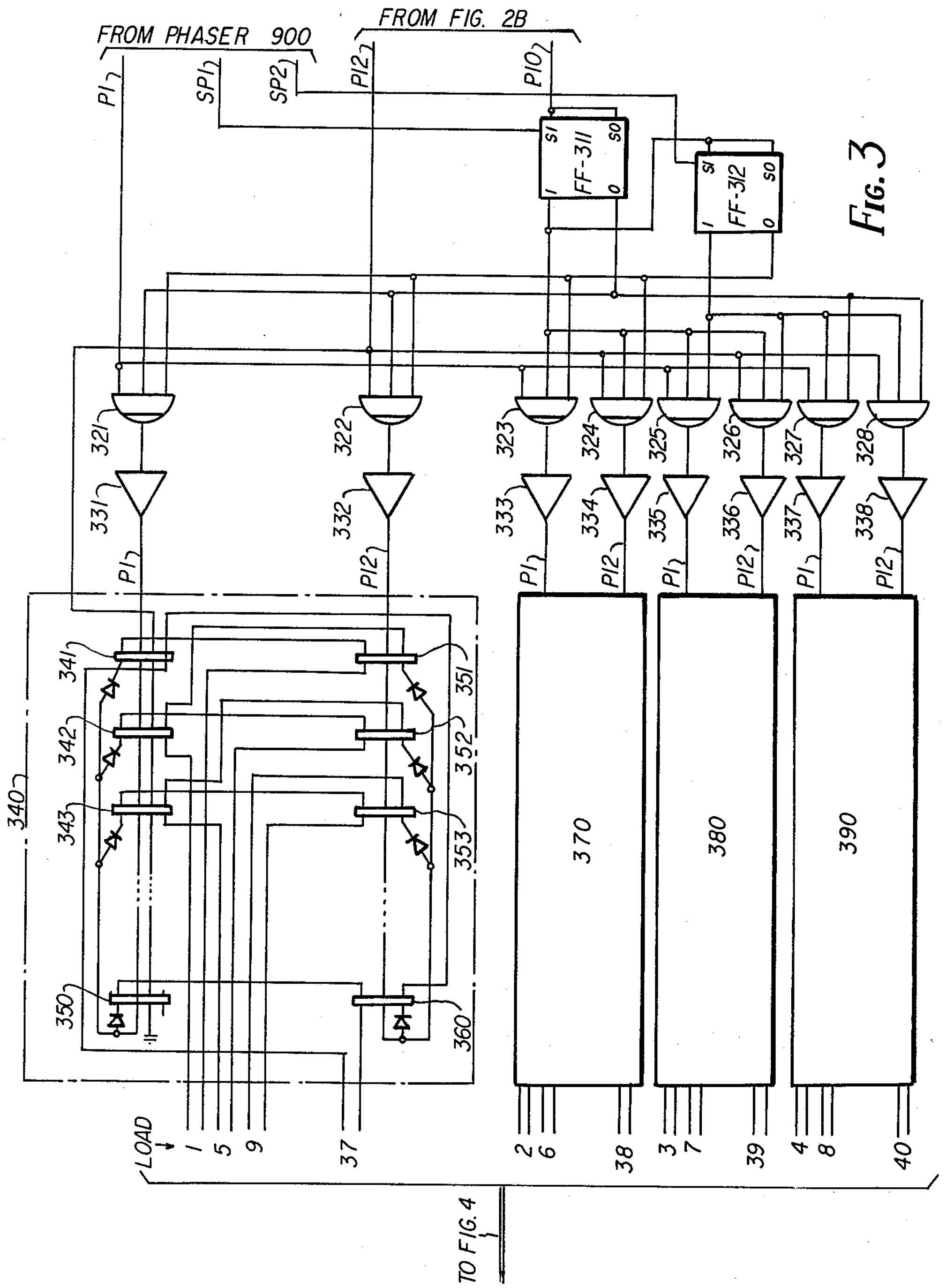
FIG. 3 is a functional diagram of the low-speed distributor.

The low-speed magnetic distributor 300 is shown in FIG. 3. Low-speed clock pulses B1 and B12 enter the driver circuitry consisting of flip-flops 311 and 312 and amplifiers 331 to 338, inclusive. The flip-flops comprise a scale of four counter and are triggered by a P10 pulse from the low-speed clock 200. The outputs of these flip-flops are gated with P1 and P12 pulses by gates 321 to 328, inclusive, to provide one of the amplifiers in each of the four amplifier groups to operate for each pulse. Pulses P1 and P12 each appear on one of the four output leads and each pair of pulses will be used to drive one of the ten stage magnetic distributors 340, 370, 380 or 390. Each of these distributors will receive every fourth P1 and P12 pulse and therefore there will be a total distribution of forty stages.

The necessary condition for the performance of logic operation is such in the case of the links, the calling party time slot must be in the same time slot as a P2 pulse of the logic cycle and that the called time slot must be in conjunction with P3. In the case of trunks, the trunk time slot must coincide with P2. The P2 of the logic cycle for any particular distributor output will always be coincident with the same DP pulse in the high-speed memory; also each of the forty logic cycles in the distributor will be coincident with a different DP pulse than any of the other thirty-nine logic cycles.

The low-speed memory 400 is shown in FIG. 4. Its configuration is similar to that for the high-speed memory previously discussed with the first twenty-eight rows being used for the link rows, the odd-numbers for the calling party, the even for the called. Since a P2 pulse is coincident with the calling party and not the called, then the logic cycle with P2 coincident with the called time slot should not appear in the memory. All logic cycles that have P2 coincident with the even-number DP pulse from 1 to 28 would not appear as rows in the low-speed memory. Each row in the memory will be read every 1360 microseconds setting flip-flops in the register control 150. Logical operations will then be performed. Twenty microseconds later the information will be written back into the memory for storage until the next "read" 1360 microseconds later.

In an electronic PABX telephone system as disclosed in this application the low-speed clock 200, low-speed distributor 300 and low-speed memory 400 and high-speed distributor 500 and memory 600 must start in proper phase with one another. The read pulse for row 1 of the high-speed memory must start at the same time as pulse P1 of the low-speed clock 200 and the read pulse for row 1 of the low-speed memory 400. Because of this requirement a system phaser 900 is used to set the proper cores in the high and low-speed distributors and the low-speed clock and also to set the flip-flops in the high and low-speed driver circuitry so that the memories 400 and 600 will be in phase.

Figure 9:
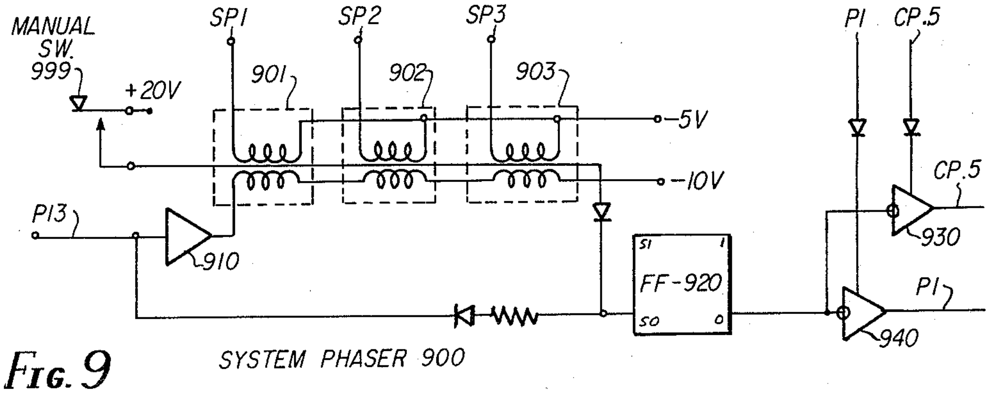
FIG. 9 is a functional diagram of the system phaser.

Referring now to FIG. 9 the system phaser includes three transformers 901, 902 and 903. A preset winding passes through each of these transformers and upon application of a positive voltage by means of a push button to this preset winding it will cause flip-flop 920 to reverse its state to turn on amplifiers 930 and 940. Turning on these amplifiers prevents read pulses from entering the high-speed or low-speed driver circuitry. The instant the preset button 999 is released the distributor circuitry in the low-speed clock 200 will start operating. The state of flip-flops 211 and 212 is not important since the circuit arrangement in the low-speed clock is such that no matter what state they are in the clock will be running properly before the appearance of a P13 pulse. A CP0.5 pulse will have occurred at least once by the time the P13 appears and therefore flip-flops in registers 130 and 190 will be set 0 and the appearance of the P13 will set all the low-speed register 150 flip-flops to state 0. The P13 pulse entering the system phaser 900 will be amplified by amplifier 910 and will cause a read-out pulse to appear from the primary windings of transformers 901, 902 and 903. The output of transformer 901 sets the counter 511 in the high-speed core driver circuitry to the proper starting state while T2 and T3 set the counter flip-flops in the low-speed core driver circuitry to the proper starting condition. P13 also applies a pulse to flip-flop 920 reversing its state and turning amplifiers 930 and 940 off. The inhibit placed by these amplifiers on the CP0.5 and the P1 pulses respectively are removed so both pulses commence at the end of a P13 pulse. At this time all conditions are met so the low and high-speed memories 400 and 600 will start in proper phase with the low-speed clock 200.

What is claimed is:

1. In a time division multiplex comunication system, a plurality of stations including, a calling station and a called station, a transmission highway, switching means operable to establish a connection between said calling station and said called station over said transmission highway, register means responsive to the initiation of a call by said calling station to control said switching means, and a memory system effective to operate said register means and said switching means comprising: a pulse source; first storage means including a plurality of ferrite cores arranged in matrix form, each of said cores having circuit connections to said registering means; second storage means including a plurality of ferrite cores arranged in matrix form, each of said cores including circuit connections to said register means and to said switching means; first pulse distributing means comprising a plurality of pulse distributor circuits each including a plurality of output circuit connections connected to said first storage means, and a plurality of input connections; pulse dividing means comprising a plurality of amplifiers each having an output termination connected to said first pulse distributing means, a plurality of gate circuits each connected at the input of one of said amplifiers and each of said gate circuits having connections to a scale of four counter, a multi-stage current steering type pulse distributor having a plurality of circuit connections to said pulse source, and having circuit connections to said scale of four counter; second pulse distributing means comprising a plurality of pulse distributor circuits each including a plurality of output circuits connected to said second storage means a plurality of input terminals connected to said pulse source; whereby said memory system is effective to establish a connection over said transmission highway between said calling station and said called station.

2. In a time division multiplex communication system, a plurality of stations including, a calling station and a called station, a transmission highway, switching means operable to establish a connection between said calling station and said called station over said transmission highway, register means responsive to the initiation of a call by said calling station to control said switching means, and a memory system effective to operate said register means and said switching means comprising a pulse source; first storage means including a plurality of ferrite cores arranged in matrix form, each of said cores having circuit connections to said registering means; second storage means including a plurality of ferrite cores arranged in matrix form, each of said cores including circuit connections to said register means and to said switching means; first pulse distributing means comprising a plurality of pulse distributor circuits each including a plurality of output circuit connections connected to said first storage means, and a plurality of input connections; pulse dividing means comprising a plurality of amplifiers each having an output termination connected to said first pulse distributing means, a plurality of gate circuits each connected at the input of one of said amplifiers and each of said gate circuits having connections to a scale of four counter, a multi-stage current steering type pulse distributor having a plurality of circuit connections to said pulse source, and having circuit connections to said scale of four counter; second pulse distributing means comprising a plurality of pulse distributor circuits each including a plurality of output circuits connected to said second storage means a plurality of input terminals connected to said pulse source; and phasing means including a plurality of transformers each having a control winding extending to either of said pulse distributing means; whereby said first and second pulse distributing means are rendered effective to transmit pulses to said first and second storage means in proper phase relationship and said memory system is effective to establish a connection over said transmission highway between said calling station and said called station.

3. In a time division multiplex communication system, a plurality of stations including, a calling station and a called station, a transmission highway, switching means operable to establish a connection between said calling station and said called station over said transmission highway, register means responsive to the initiation of a call by said calling station to control said switching means, and a memory system effective to operate said register means and said switching means comprising: a pulse source; first storage means including a plurality of ferrite cores arranged in matrix form, each of said cores having circuit connections to said register means; second storage means including a plurality of ferrite cores arranged in matrix form, each of said cores including circuit connections to said register means and said switching means; first pulse distributing means connected to said first storage means; pulse dividing means including circuit connections to said pulse source and to said first pulse distributing means; second pulse distributing means connected to said second storage means and also including circuit connections to said pulse source; whereby said memory system is effective to establish a connection over said transmission highway between said calling station and said called station.

4. In a communication system the combination as claimed in claim 3, wherein said first storage means include a plurality of ferrite cores arranged in matrix form comprising a plurality of horizontal rows and a plurality of vertical rows, each of said vertical rows including a sense winding in common with all of said cores in said row and a partialled write winding common to all of said cores in said row, each of said horizontal rows including a partial write winding common to all of said cores in said row and a read winding common to all of said cores in said row, all of said sense windings and said partial write windings in said vertical rows having circut connections to said register means; each of said partial write windings and said read windings in all of said horizontal rows having circuit connections to said pulse distribution means.

5. In a communication system the combination as claimed in claim 3, wherein said second storage means include a plurality of ferrite cores arranged in matrix form comprising a plurality of horizontal rows and a plurality of vertical rows, each of said vertical rows including a sense winding in common with all of said cores in said row and a partialled write winding common to all of said cores in said row, each of said horizontal rows including a partial write winding common to all of said cores in said row and a read winding common to all of said cores in said row, all of said sense windings and said partial write windings in said vertical rows having circuit connections to said register means; each of said partial write windings and said read windings in all of said horizontal rows having circuit connections to said pulse distribution means; and each of said partial write windings in all of said horizontal rows having circuit connections to said switching means.

6. In a communication system the combination as claimed in claim 3, wherein said first pulse distribution means comprise: a counter including a bistable multivibrator; a plurality of gate circuits having circuit connections to said pulse source and to said multivibrator; a plurality of amplifier circuits each having circuit connections to a different one of said plurality of gate circuits; and a plurality of current steering distributor circuits each adapted to receive pulses from and having circuit connections to two of said amplifiers; said current steering distributor circuits each including a plurality of connections to said first storage means.

7. In a communication system the combination as claimed in claim 3, wherein said pulse dividing means comprising a scale of two counter having input circuit connections to said pulse source; a plurality of multivibrators; a pulse distribution matrix connecting said scale of two counter to said plurality of multivibrators; a plurality of output amplifiers; and a plurality of gate circuits each having a plurality of input connections connected to said multivibrators and an output connection connected to said amplifiers; the output terminals of said amplifiers including a plurality of circuit connections to said first pulse distribution means.

8. In a communication system the combination as claimed in claim 3, wherein said second pulse distribution means comprise: a counter including a first bistable multivibrator; a second bistable multivibrator having circuit connections to said first multivibrator; a plurality of gate circuits having circuit connections to said pulse source and to said first and second multivibrators; a plurality of amplifier circuits each having circuit connections to a different one of said plurality of gate circuits; and a plurality of current steering distributor circuits each adapted to receive pulses from and having circuit connections to two of said amplifiers; said current steering distributor circuits each including a plurality of connections to said second storage means.

9. In a time division multiplex communication system, a plurality of stations including, a calling station and a called station, a transmission highway, switching means operable to establish a connection between said calling station and said called station over said transmission highway, register means responsive to the initiation of a call by said calling station to control said switching means, and a memory system effective to operate said register means and said switching means comprising: a pulse source; first storage means including a plurality of ferrite cores arranged in matrix form, each of said cores having circuit connections to said register means; second storage means including a plurality of ferrite cores arranged in matrix form, each of said cores having circuit connections to said register means and to said switching means; first pulse distributing means connected to said first storage means; pulse dividing means including circuit connections to said pulse source and to said first pulse distributing means; second pulse distributing means connected to said second storage means and also including circuit connections to said pulse source; and phasing means having separate circuit connections to each of said first and second pulse distributing means; whereby said first and second pulse distributing means are rendered effective to transmit pulses to said first and second storage means in proper phase relationship and said memory system is effective to establish a connection over said transmission highway between said calling station and said called station.

10. In a communication system the combination as claimed in claim 9, wherein said first storage means include a plurality of ferrite cores arranged in matrix form comprising a plurality of horizontal rows and a plurality of vertical rows, each of said vertical rows including a sense winding in common with all of said cores in said row and a partial write winding common to all of said cores in said row, each of said horizontal rows including a partial write winding common to all of said cores in said row and a read winding common to all of said cores in said row, all of said sense windings and said partial write windings in said vertical rows having circuit connections to said register means; each of said partial write windings and said read windings in all of said horizontal rows having circuit connections to said pulse distribution means.

11. In a communication system the combination as claimed in claim 9, wherein said second storage means include a plurality of ferrite cores arranged in matrix form comprising a plurality of horizontal rows and a plurality of vertical rows, each of said vertical rows including a sense winding in common with all of said cores in said row and a partialled write winding common to all of said cores in said row, each of said horizontal rows including a partial write winding common to all of said cores in said row and a read winding common to all of said cores in said row, all of said sense windings and said partial write windings in said vertical rows having circuit connections to said register means; each of said partial write windings and said read windings in all of said horizontal rows having circuit connections to said pulse distribution means; and each of said partial write windings in all of said horizontal rows having circuit connections to said switching means.

12. In a communication system the combination as claimed in claim 9, wherein said first pulse distribution means comprise: a counter including a bistable multivibrator; a plurality of gate circuits having circuit connections to said pulse source and to said multivibrator; a plurality of amplifier circuits each having circuit connections to a different one of said plurality of gate circuits; and a plurality of current steering distributor circuits each adapted to receive pulses from and having circuit connections to two of said amplifiers; said current steering distributor circuits each including a plurality of connections to said first storage means.

13. In a communication system the combination as claimed in claim 9, wherein said pulse dividing means comprising a scale of two counter having input circuit connections to said pulse source; a plurality of multivibrators; a pulse distribution matrix connecting said scale of two counter to said plurality of multivibrators; a plurality of output amplifiers; and a plurality of gate circuits each having a plurality of input connections connected to said multivibrators and an output connection connected to said amplifiers; the output terminals of said amplifiers including a plurality of circuit connections to said first pulse distribution means.

14. In a communication system the combination as claimed in claim 9, wherein said second pulse distribution means comprise: a counter including a first bistable multivibrator; a second bistable multivibrator having circuit connections to said first multivibrator; a plurality of gate circuits having circuit connections to said pulse source and to said first and second multivibrators; a plurality of amplifier circuits each having circuit connections to a different one of said plurality of gate circuits; and a plurality of current steering distributor circuits each adapted to receive pulses from and having circuit connections to two of said amplifiers; said current steering distributor circuits each including a plurality of connections to said second storage means.

15. In a communication system the combination as claimed in claim 9, wherein said phasing means includes: a plurality of transformers, each of said transformers having an individual circuit connection to one of said pulse distributors; a switch connected to a source of direct current and adapted to extend direct current to said transformers; a multivibrator having input connections to said switch and to said pulse dividing means; a plurality of inverter amplifiers having their outputs connected to said pulse distributors and each having a first input connected to said multivibrator and a second input connected to said pulse dividing means.

References Cited in the file of this patent

UNITED STATES PATENTS

| | | |
|---|---|---|
| 2,754,367 | Levy | July 10, 1956 |
| 2,766,327 | Lesti | Oct. 9, 1956 |
| 2,854,516 | Faulkner | Sept. 30, 1958 |